United States Patent
Rom et al.

(10) Patent No.: US 11,817,919 B2
(45) Date of Patent: Nov. 14, 2023

(54) BEAM STEERING APPARATUS AND METHOD

(71) Applicant: NOKIA TECHNOLOGIES OY, Espoo (FI)

(72) Inventors: Christian Rom, Aalborg (DK); Benny Vejlgaard, Gistrup (DK); Simon Svendsen, Aalborg (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/555,078

(22) Filed: Dec. 17, 2021

(65) Prior Publication Data

US 2022/0200665 A1    Jun. 23, 2022

(30) Foreign Application Priority Data

Dec. 18, 2020   (FI) ..................................... 20206330

(51) Int. Cl.
   *H04B 7/0404*   (2017.01)
   *H01Q 3/26*   (2006.01)
   *H04B 1/3827*   (2015.01)

(52) U.S. Cl.
   CPC ......... *H04B 7/0404* (2013.01); *H01Q 3/2611* (2013.01); *H04B 1/3838* (2013.01)

(58) Field of Classification Search
   CPC .. H04B 7/0404; H04B 7/0617; H04B 7/0857; H04B 7/086; H04B 1/3838; H01Q 3/2611
   See application file for complete search history.

(56) References Cited

U.S. PATENT DOCUMENTS

| 9,749,018 B2 | 8/2017 | Tanabve |
| 10,582,455 B2 | 3/2020 | Sanderovich et al. |

(Continued)

FOREIGN PATENT DOCUMENTS

| EP | 3609088 A1 | 2/2020 |
| EP | 3809604 A1 | 4/2021 |

(Continued)

OTHER PUBLICATIONS

Office Action for Finland Application No. 20206330 dated May 17, 2021, 8 pages.

(Continued)

*Primary Examiner* — Siu M Lee
(74) *Attorney, Agent, or Firm* — ALSTON & BIRD LLP (57) ABSTRACT

An apparatus and method for beam steering is disclosed. The apparatus comprises: a beam forming signal generator configured to generate a beam forming signal for applying to at least one of amplitude and phase shift circuitry associated with an antenna array to provide a radiation pattern. A determining means is provided that is configured to determine a signal strength of interfering signals received at the antenna array within a user equipment and to determine a dominant interfering ratio indicative of a strength of a strongest interfering signal relative to a strength of other interfering signals. A comparator is provided that is configured to compare the dominant interfering ratio to a predetermined ratio value and where the dominant interfering ratio exceeds the predetermined ratio value to generate a control signal for controlling the beam forming signal generator to generate a radiation pattern comprising a beam and at least one steered null.

20 Claims, 7 Drawing Sheets

(56) References Cited

U.S. PATENT DOCUMENTS

| | | | |
|---|---|---|---|
| 10,720,978 | B1 | 7/2020 | Sun et al. |
| 2008/0231500 | A1* | 9/2008 | Heikkila .................. H04L 1/20 |
| | | | 342/159 |
| 2011/0053633 | A1* | 3/2011 | Han ..................... H04B 7/0619 |
| | | | 455/522 |
| 2012/0249370 | A1 | 10/2012 | Okamoto |
| 2013/0114451 | A1 | 5/2013 | Al-Dhahir et al. |
| 2013/0229935 | A1 | 9/2013 | Gorokhov et al. |
| 2013/0322277 | A1* | 12/2013 | Vanganuru ............ H04W 24/08 |
| | | | 370/252 |
| 2014/0242977 | A1 | 8/2014 | Kim et al. |
| 2016/0254886 | A1* | 9/2016 | Bontu .................. H04L 1/0026 |
| | | | 455/452.1 |
| 2019/0074854 | A1 | 3/2019 | Raghavan et al. |
| 2019/0268776 | A1 | 8/2019 | Eitan et al. |

FOREIGN PATENT DOCUMENTS

| | | |
|---|---|---|
| WO | WO 2018/009516 A1 | 1/2018 |
| WO | WO 2020/028584 A1 | 2/2020 |
| WO | WO 2020/033197 A1 | 2/2020 |

OTHER PUBLICATIONS

"3rd Generation Partnership Project; Technical Specification Group Radio Access Network; Study on New Radio Access Technology Physical Layer Aspects (Release 14)", 3GPP TR 38.802 v14.2.0, (Sep. 2017), 144 pages.

"3rd Generation Partnership Project; Technical Specification Group Radio Access Network; Cross Link Interference (CLI) handling and Remote Interference Management (RIM) for NR; (Release 16)", 3GPP TR 38.828 v16.1.0, (Sep. 2019), 96 pages.

"3rd Generation Partnership Project; Technical Specification Group Radio Access Network; NR; User Equipment (UE) radio transmission and reception; Part 2: Range 2 Standalone (Release 16)", 3GPP TS 38.101-2 v16.3.1, (Mar. 2020), 170 pages.

"3rd Generation Partnership Project; Technical Specification Group Radio Access Network; NR; Physical layer procedures for data (Release 15)", 3GPP TS 38.214 v15.7.0 (Sep. 2019), 106 pages.

"3rd Generation Partnership Project; Technical Specification Group Radio Access Network; NR; Physical layer procedures for data (Release 16)", 3GPP TS 38.214 v16.1.0, (Mar. 2020), 151 pages.

Fernandez-Lopez et al., "Interference characterization and mitigation benefit analysis for LTE-A macro and small cell deployments", EURASIP Journal on Wireless Communications and Networking 2015, Article No. 110, (Apr. 18, 2015), 12 pages.

Soret et al., "Interference Coordination for Dense Wireless Networks", IEEE Communications Magazine, vol. 53, Issue: 1, (Jan. 2015), pp. 102-109.

Soret et al., "On-Demand Power Boost and Cell Muting for High Reliability and Low Latency in 5G", 2017 IEEE 85th Vehicular Technology Conference (VTC Spring), (Jun. 4-7, 2017), 5 pages.

Bas et al., "Real-Time Millimeter-Wave MIMO Channel Sounder for Dynamic Directional Measurements", IEEE Transactions on Vehicular Technology, vol. 68, No. 9, (Sep. 2019), 15 pages.

Smain Femmam, "Fundamentals of Signals and Control Systems", Wiley, (Feb. 13, 2017), 286 pages.

Extended European Search Report for European Application No. 21213337.5 dated May 25, 2022, 10 pages.

\* cited by examiner

A: interference level before standing wave

B: interference level after standing wave

FIG. 5

| Codebook | Sub 6Ghz lineup | mmWave lineup | PMU | Ext. Electronics |
|---|---|---|---|---|
| Entry nb 1 | on | on | on | on |
| Entry nb 2 | on | on | on | off |
| Entry nb 3 | on | on | off | on |
| Entry nb 4 | on | on | off | off |
| Entry nb 5 | on | off | on | on |
| Entry nb 6 | on | off | on | off |
| Entry nb 7 | on | off | off | on |
| Entry nb 8 | on | off | off | off |
| Entry nb 9 | on | on | on | on |
| Entry nb 10 | on | on | on | off |
| Entry nb 11 | on | on | off | on |
| Entry nb 12 | on | on | off | off |
| Entry nb 13 | on | off | on | on |
| Entry nb 14 | on | off | on | off |
| Entry nb 15 | on | off | off | on |

BEAM STEERING APPARATUS AND METHOD

CROSS-REFERENCE TO RELATED APPLICATIONS

This application claims priority to Finnish Application No. 20206330, filed Dec. 18, 2020, the entire contents of which are incorporated herein by reference.

TECHNOLOGICAL FIELD

Various example embodiments relate to a method and apparatus for beam forming at a portable electronic device such as a user equipment (UE).

BACKGROUND

Beam forming or steering may be used with an antenna array comprising multiple antenna elements to improve reception of a desired signal. Where there is interference from other signals then the generation of one or more steered nulls, that is portions of the radiation pattern around a UE with low signal strength whose direction is controlled, can help to improve the signal to interference plus noise ratio (SINR) at the UE. However, such beam steering is complex and has a processing power, power and time overhead associated with it and there may be situations where beam steering may not provide much if any signal improvement. Furthermore, where the conditions around an antenna array are dynamic, then the preferred radiation pattern may vary.

It would be desirable to provide a beam steering apparatus and method that addresses at least some of these issues.

BRIEF SUMMARY

The scope of protection sought for various embodiments of the invention is set out by the independent claims. The embodiments/examples and features, if any, described in this specification that do not fall under the scope of the independent claims are to be interpreted as examples useful for understanding various embodiments of the invention.

According to various, but not necessarily all, embodiments of the invention there is provided according to a first aspect an apparatus comprising: beam forming signal generator configured to generate a beam forming signal for applying to at least one of amplitude and phase shift circuitry associated with an antenna array to provide a radiation pattern; and determining means configured to determine a signal strength of interfering signals received at said antenna array within a user equipment and determine a dominant interfering ratio indicative of a strength of a strongest interfering signal relative to a strength of other interfering signals; and a comparator configured to compare said dominant interfering ratio to a predetermined ratio value and where said dominant interfering ratio exceeds said predetermined ratio value to generate a control signal for controlling said beam forming signal generator to generate a radiation pattern comprising a beam and at least one steered null.

Beam forming or steering may be used with one or more antenna arrays comprising multiple antenna elements to improve reception of a desired signal. Where there is interference from other signals then the generation of one or more steered nulls, that is portions of the radiation pattern around a UE with low signal strength whose direction is controlled, can help to improve the signal to interference plus noise ratio. However, the generation of such steered nulls is not without overheads and may only provide effective signal to noise improvement for certain interference patterns. The inventors recognised that the dominant interfering ratio is a good indicator as to how much one or more steered nulls may improve the signal to noise levels, and thus, embodiments determine the dominant interfering ratio and use this as a factor when deciding whether to provide at least one steered null or not.

In some embodiments, said apparatus comprises a plurality of antenna arrays, said beam forming signal generator configured to generate a beam forming signal for applying to at least one of amplitude and phase shift circuitry associated with said plurality of antenna arrays to provide a radiation pattern.

In some embodiments there is just one steered null.

In some embodiments the one steered null is directed to the strongest interferer.

In some embodiments, said comparator is further configured in response to said dominant interfering ratio being less than said predetermined ratio value to generate a control signal for controlling said beam forming signal generator to generate radiation pattern comprising a beam and no steered nulls.

In some embodiments, said determining means is further configured to determine a signal to interference plus noise ratio and in response to said signal to interference plus noise ratio being greater than a predetermined value to generate a control signal to control said beam forming signal generator to generate a radiation pattern comprising a beam and no steered nulls.

In some embodiments, said determining means is further configured in response to said signal to interference plus noise ratio being greater than a predetermined value not to determine said signal strength of said interfering signals.

According to various, but not necessarily all, embodiments of the invention there is provided according to a second aspect an apparatus comprising: a beam forming signal generator configured to apply a beam forming signal to amplitude and phase shift circuitry associated with an antenna array to generate a radiation pattern at said antenna array comprising a beam and at least one steered null; and means configured to detect at least one condition change at said user equipment that affects nulls in said radiation pattern and to amend said beam forming signal to reduce changes in said at least one steered null.

In some embodiments said monitoring means configured to detect at least one condition change comprises a standing wave detector.

In some embodiments, said apparatus further comprises: monitoring means configured to monitor for at least one condition change at said user equipment that affects nulls in a radiation pattern at said user equipment when said beam forming signal applied to said amplitude and phase shift circuitry comprises one to generate a radiation pattern comprising a beam and at least one steered null, said monitoring means being configured in response to detecting said at least one condition change to generate a control signal to apply to said beam forming signal generator to control said beam forming signal generator to amend said beam forming signal to at least partially compensate for changes in said at least one steered null in said radiation pattern.

In some embodiments, said beam forming signal generator is configured to amend said beam forming signal to generate a plurality of updated radiation patterns by changing an angular position of said at least one steered null a plurality of times; said determining means being configured to determine a preferred angular position of said at least one steered null, by determining at least one of: received power, signal to interference plus noise ratio and said dominant interfering ratio for said plurality of updated radiation patterns.

In some embodiments, said monitoring means is configured to detect said at least one condition change from at least one of a detected reduction in received power at said antenna array; a reduction in signal to interference plus noise ratio; and an increase in said dominant interfering ratio.

In some embodiments, said monitoring means is configured to detect said at least one condition change from a detected reduction in received power at said antenna array; a reduction in signal to interference plus noise ratio; and an increase in said dominant interfering ratio.

In some embodiments, said monitoring means is configured to detect said at least one condition change, by detecting at least one of: changes in a user's proximity from a proximity sensor, and changes in operational conditions of at least one of a plurality of predetermined components within said user equipment.

In some embodiments said changes in operational conditions comprise a change in state of at least one of a plurality of predetermined components within said user equipment. In some embodiments the change in state comprises the activation or deactivation of the component.

In some embodiments, said apparatus further comprises a data base for storing a plurality of signal vectors for applying to said at least one of amplitude and phase shift circuitry to generate different radiation patterns; said beam forming signal generator being configured to generate said beam forming signal by selecting one of said plurality of signal vectors.

In some embodiments, said beam forming signal generator is configured to amend said beam forming signal to at least partially compensate for changes in said at least one steered null in said radiation pattern by selecting an updated value from said data base and determining from said determining means whether said signal to interference plus noise ratio increases and if not discarding said selected value and selecting a further value.

In some embodiments, said beam forming signal generator is configured to amend said beam forming signal by selecting an amended data base entry related to said detected predetermined operational change.

In some embodiments, said beam forming signal generator is configured to amend said beam forming signal to at least partially compensate for changes in said at least one steered null in said radiation pattern by applying an algorithm related to said determined change in operational conditions to said beam forming signal and determining from said determining means whether said signal to interference plus noise ratio increases. Where the signal to interference plus noise ratio does not increase the updated beam forming signal is discarded and in some cases a different algorithm is applied.

In some embodiments, said monitoring means, determining means, beam forming signal generator and comparator comprise: at least one processor; and at least one memory including computer program code, said at least one memory and computer program code being configured to, with said at least one processor, cause the apparatus to perform at least the following: determine a signal strength of interfering signals received at an antenna system within a user equipment; determine a dominant interfering ratio indicative of a strength of a strongest interfering signal relative to a strength of other interfering signals; and compare said dominant interfering ratio to a predetermined ratio value; and where said dominant interfering ratio exceeds said predetermined ratio value generating a beam forming signal for applying to at least one of amplitude and phase shift circuitry associated with said antenna array to generate a radiation pattern comprising a beam and at least one steered null.

According to various, but not necessarily all, embodiments of the invention there is provided according to a third aspect a user equipment comprising: an antenna array comprising a plurality of antenna elements; amplitude and phase shift circuitry associated with said antenna elements of said antenna array; and an apparatus according to a first or second aspect.

According to various, but not necessarily all, embodiments of the invention there is provided according to a fourth aspect a method comprising: determining a signal strength of interfering signals received at an antenna array within a user equipment; determining a dominant interfering ratio indicative of a strength of a strongest interfering signal relative to a strength of other interfering signals; and comparing said dominant interfering ratio to a predetermined ratio value; and where said dominant interfering ratio exceeds said predetermined ratio value generating a beam forming signal for applying to at least one of amplitude and phase shift circuitry associated with said antenna array to generate a radiation pattern comprising a beam and at least one steered null.

In some embodiments, said method further comprises: where said dominant interfering ratio is less than said predetermined value generating said beam forming signal to apply to said at least one of amplitude and phase shift circuitry associated with said antenna array to generate a radiation pattern comprising a beam and no steered nulls.

In some embodiments, said method further comprises an initial step of determining a signal to interference plus noise ratio and where said signal to interference plus noise ratio is greater than a predetermined value not performing said steps of said method to determine said signal strengths of interfering signals, and generating said beam forming signal to apply to said at least one of amplitude and phase shift circuitry associated with said antenna array to generate a radiation pattern comprising a beam and no steerable nulls.

According to various, but not necessarily all, embodiments of the invention there is provided according to a fifth aspect a method comprising: generating a beam forming signal to apply to at least one of amplitude and phase shift circuitry associated with an antenna array to generate a radiation pattern at said antenna array comprising a beam and at least one steered null; detecting at least one condition change at said user equipment that affects nulls in said radiation pattern and amending said beam forming signal to reduce changes in said at least one steered null.

In some embodiments, said method further comprises when said beam forming signal applied to said at least one of amplitude and phase shift circuitry generates a radiation pattern comprising a beam and at least one steered null, monitoring for at least one condition change at said user equipment that affects nulls in a radiation pattern at said user equipment; and in response to detecting said at least one condition change amending said beam forming signal to at least partially compensate for changes in said at least one steered null in said radiation pattern.

In some embodiments, said step of detecting said at least one condition change affecting said radiation pattern comprises detecting at least one of: a reduction in received power at said antenna array; a reduction in signal to interference plus noise ratio; and an increase in said dominant interfering ratio.

In some embodiments, in response to detecting said at least one condition change, generating an updated beam forming signal configured to change an angular position of said at least one null and determining a preferred angular position of said at least one null, by detecting said received power, said signal to interference plus noise ratio and said dominant interfering ratio for said updated signals.

In some embodiments, said method further comprises determining said at least one condition triggering said change in said radiation pattern, by determining at least one of changes in proximity of a user and changes in operational conditions of at least one of a plurality of predetermined components within said user equipment.

In some embodiments, said method further comprises determining said at least one operational condition triggering said change in said radiation pattern, by detecting a predetermined operational change in at least one of a plurality of predetermined components within said user equipment.

In some embodiments, said beam forming signal is selected from a data base storing beam forming signal vectors for applying to said at least one of amplitude and phase shift circuitry to generate different radiation patterns.

In some embodiments, said step of amending said beam forming signal comprises selecting a further value from said data base and determining whether said signal to interference plus noise ratio increases and if not discarding said selected value and selecting a further value.

In some embodiments, said step of amending said beam forming signal comprises selecting an amended data base entry related to said detected predetermined operational change.

In some embodiments, said step of amending said beam forming signal comprises applying an algorithm related to said determined change in operational conditions to said beam forming signal.

According to various, but not necessarily all, embodiments of the invention there is provided according to a sixth aspect a computer program comprising instructions for causing an apparatus to perform a method according to a fourth or fifth aspect.

According to various, but not necessarily all, embodiments of the invention there is provided according to a seventh aspect an apparatus comprising: a beam forming signal generator configured to generate a beam forming signal for applying to at least one of amplitude and phase shift circuitry associated with an antenna array to provide a radiation pattern; and determining circuitry configured to determine a signal strength of interfering signals received at said antenna array within a user equipment and determine a dominant interfering ratio indicative of a strength of a strongest interfering signal relative to a strength of other interfering signals; and a comparator configured to compare said dominant interfering ratio to a predetermined ratio value and where said dominant interfering ratio exceeds said predetermined ratio value to generate a control signal for controlling said beam forming signal generator to generate a radiation pattern comprising a beam and at least one steered null.

In some embodiments, said comparator is further configured in response to said dominant interfering ratio being less than said predetermined ratio value to generate a control signal for controlling said beam forming signal generator to generate radiation pattern comprising a beam and no steered nulls.

In some embodiments, said determining circuitry is further configured to determine a signal to interference plus noise ratio and in response to said signal to interference plus noise ratio being greater than a predetermined value to generate a control signal to control said beam forming signal generator to generate a radiation pattern comprising a beam and no steered nulls.

In some embodiments, said determining circuitry is further configured in response to said signal to interference plus noise ratio being greater than a predetermined value not to determine said signal strength of said interfering signals.

According to various, but not necessarily all, embodiments of the invention there is provided according to an eighth aspect an apparatus comprising: a beam forming signal generator configured to apply a beam forming signal to amplitude and phase shift circuitry associated with an antenna array to generate a radiation pattern at said antenna array comprising a beam and at least one steered null; and circuitry configured to detect at least one condition change at said user equipment that affects nulls in said radiation pattern and to amend said beam forming signal to reduce changes in said at least one steered null.

In some embodiments, said apparatus further comprises: monitoring circuitry configured to monitor for at least one condition change at said user equipment that affects nulls in a radiation pattern at said user equipment when said beam forming signal applied to said amplitude and phase shift circuitry comprises one to generate a radiation pattern comprising a beam and at least one steered null, said monitoring circuitry being configured in response to detecting said at least one condition change to generate a control signal to apply to said beam forming signal generator to control said beam forming signal generator to amend said beam forming signal to at least partially compensate for changes in said at least one steered null in said radiation pattern.

In some embodiments, said beam forming signal generator is configured to amend said beam forming signal to generate a plurality of updated radiation patterns by changing an angular position of said at least one steered null a plurality of times; said determining circuitry being configured to determine a preferred angular position of said at least one steered null, by determining at least one of: received power, signal to interference plus noise ratio and said dominant interfering ratio for said plurality of updated radiation patterns.

In some embodiments, said monitoring circuitry is configured to detect said at least one condition change from at least one of a detected reduction in received power at said antenna array; a reduction in signal to interference plus noise ratio; and an increase in said dominant interfering ratio.

In some embodiments, said monitoring circuitry is configured to detect said at least one condition change from a detected reduction in received power at said antenna array; a reduction in signal to interference plus noise ratio; and an increase in said dominant interfering ratio.

In some embodiments, said monitoring circuitry is configured to detect said at least one condition change, by detecting at least one of: changes in a user's proximity from a proximity sensor, and changes in operational conditions of at least one of a plurality of predetermined components within said user equipment.

In some embodiments said changes in operational conditions comprise a change in state of at least one of a plurality of predetermined components within said user equipment. In some embodiments the change in state comprises the activation or deactivation of the component.

In some embodiments, said apparatus further comprises a data base for storing a plurality of signal vectors for applying to said at least one of amplitude and phase shift circuitry to generate different radiation patterns; said beam forming signal generator being configured to generate said beam forming signal by selecting one of said plurality of signal vectors.

In some embodiments, said beam forming signal generator is configured to amend said beam forming signal to at least partially compensate for changes in said at least one steered null in said radiation pattern by selecting an updated value from said data base and determining from said determining circuitry whether said signal to interference plus noise ratio increases and if not discarding said selected value and selecting a further value.

In some embodiments, said beam forming signal generator is configured to amend said beam forming signal by selecting an amended data base entry related to said detected predetermined operational change.

In some embodiments, said beam forming signal generator is configured to amend said beam forming signal to at least partially compensate for changes in said at least one steered null in said radiation pattern by applying an algorithm related to said determined change in operational conditions to said beam forming signal and determining from said determining circuitry whether said signal to interference plus noise ratio increases. Where the signal to interference plus noise ratio does not increase the updated beam forming signal is discarded and in some cases a different algorithm is applied.

In some embodiments, said determining circuitry comprises: at least one processor; and at least one memory including computer program code, said at least one memory and computer program code being configured to, with said at least one processor, cause the performance of the apparatus.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided.

Antenna arrays formed of multiple antenna elements may have control circuitry associated with them that control the phase shift and/or amplitude of the signal received from each antenna element such that the signals received constructively or destructively interfere with each other and in this way the radiation pattern seen by the antenna array is controlled. This is termed beamforming or spatial filtering and is a signal processing technique used in sensor arrays for directional signal transmission or reception. This directional transmission or reception is achieved by combining elements in an antenna array in such a way that signals at particular angles experience constructive interference (the beam direction) while others experience destructive interference (the null direction). Beamforming can be used at both the transmitting and receiving ends in order to achieve spatial selectivity. The improvement compared with omnidirectional reception/transmission is known as the directivity of the array.

In effect the radiation pattern may be controlled to provide beams of a strong signal in one or more directions and steered nulls where there is no or limited radiation in other directions. This can be used to steer beams towards a desired signal source while nulls may be steered towards one or more interfering sources.

A UE operating, for example, in the 5G NR millimetre wave band(s) may have one or more antenna array which can have dynamic beam steering to reduce interference levels received at the UE and improve the radio link performance by controlling the shape of the radiation pattern produced by the UE.

The optimal or improved radiation pattern will depend on the signals received at the user equipment and in particular the strength of the interfering signal, the number of interfering signals and the signal to interference plus noise ratio. Where the user equipment is operating in a regime where interference and noise levels are low then there may be no need for beam steering or at least no need for the generation of steered nulls to reduce interference. Similarly, where there are many different interferers from different directions then the generation of a steered null may not be particularly helpful. Thus, in example embodiments prior to generating any particular radiation pattern the user equipment may determine at least one of the signal to interference plus noise ratio and the dominant interferer ratio DIR factor, and only where the signal to interference plus noise ratio is below a certain threshold and the DIR factor is above a certain threshold indicating that there is one particular dominant interferer will the control circuitry associated with the antenna array generate a radiation beam pattern with a beam and at least one steered null. In this way, the processing power associated with determining the preferred radiation pattern and applying the beam forming signal to the amplitude and/or phase shift circuitries is only used when the effect will be particularly advantageous.

The criteria as to whether or not to apply beam nulling are summarised below: Establish if there are valid conditions to apply nulling technique through evaluation of the DIR factor. IF the DIR factor is above a threshold and the SINR is below a threshold, beam nulling has good performance enhancement conditions. If the DIR factor is below a certain threshold then it will not make sense to perform beam nulling.

DIR Factor Definition

The dominant interferer ratio indicates the ratio between the strongest interferer and the rest of the interferers. It is defined as:

$$DIR = \frac{I1}{\sum_n In - I1 + N}, I1 \geq I2 \geq \ldots \geq In,$$

Where I1 represents the strongest interferer. DIR can be interpreted as an indicator for the potential performance benefit that would be obtained assuming ideal cancellation of the main interferer.

Estimate DIR Factor in 5G NR

A high sampling rate and regular source of data to estimate the surrounding cell power levels at the UE is available by decoding the SSB (synchronisation signal block) Burst. From the SSB Burst the UE will be able to retrieve the signal strength of all the target cells within range.

For this application we propose to match the interference values to the signal strength of the target cells. The serving cell signal strength is not considered in DIR factor evaluation.

In short I1 will be given the RSRP (reference signal received power) value of the strongest target cell estimated from a SSB Burst. I2 will then be given the RSRP value of the second strongest target cell and so forth. Notice that Signal strength and interference level are not the same, however we will compensate for this in the following.

When can the UE Benefit from Nulling Interference?

Given that the DIR factor is calculated as above, 2 elements need to be considered. First, the UE checks that there is actual interference to be cancelled by evaluating the SINR level. A typical SINR can range from −10 dB to above 30 dB. An SINR_nulling_threshold is defined as the level at which nulling should be applied. This threshold is configurable, and an example value could be 15 dB.

Secondly, the estimated DIR factor should be compared to a DIR_nulling_threshold in order to establish if there is a clear strong interferer or several of similar strengths. Only in the case that there is a clear strong interferer the nulling should take place.

To summarize the estimated DIR factor indicates the potential gain for nulling and the SINR level indicates that there is data load on the strongest interferer and that nulling is beneficial.

The logical Boolean expression of the decision criterion for applying beam nulling is thus:

((SINR>SINR_nulling_threshold)&
(DIR>DIR_nulling_threshold)).

A further potential issue that arises with antenna arrays within a user equipment is that the radiation pattern around the user equipment may change depending on factors such as the proximity of any part of the user's body or changes in the casing, for example an additional protective cover which is fitted over the external housing of the UE and/or the addition of a selfie stick or other UE holder close to the antenna array and/or operational changes in components within the user equipment including activation or deactivation of the components and/or external to the user equipment such as plugging in a charger or data cable. These factors and therefore the radiation pattern may vary during use of the user equipment when a signal is being received. These factors may not unduly affect the main beam but may have a significant effect on the nulls in the radiation pattern. In effect changes in conditions within or around the user equipment may result in changes in standing waves at the user equipment which in turn trigger changes in the radiation pattern and in particular, changes in the nulls.

Thus, in example embodiments where beam forming circuitry is forming a radiation pattern having one or more steered nulls, circuitry within the user equipment may monitor for conditions that are known to affect the radiation pattern. This may be by direct detection of the conditions themselves that is the switching on or off of components, the plugging in of a charger or by detecting the proximity of a user or other device using a proximity sensor, and/or it may be by detecting changes in the radiation pattern by detecting changes in the received power, and/or changes in the signal to interference plus noise.

When the circuitry determines such changes and where they exceed a particular threshold then the beam forming circuitry may seek to change the beam steering signal applied to the amplitude and/or phase shift circuitry associated with the antenna array to compensate for the changes in conditions at the user equipment and in particular, to compensate for changes in the steered nulls so as to seek to restore the radiation pattern to one that is the same or at least similar to that before the change in conditions. In this way, changing conditions within a user equipment that will affect the interference of a signal can be compensated for by changing the beam forming signals associated with the antenna array.

In some cases, changes in conditions may be detected that are expected to change the radiation pattern in a certain manner and changes may be made to the beam steering signal without first monitoring the radiation pattern. This may allow the user equipment to react quickly to any changes and reduce processing power. In this regard machine learning may be used to determine how changes in various factors such as the movement and/or proximity of the user, the removal of a case or the turning on or off of particular components, affect particular steered nulls and the best way to compensate for these changes may be deduced and stored. This learned behaviour may then be used to compensate for such changes as the changes in conditions are detected without the need to first assess how the signal and noise received at the user equipment are affected.

The beam forming signal or vector to be applied to the amplitude and/or phase shift circuitry may be determined from a data base that may comprise limited pre-characterised combinations of phase shift and/or power levels to be applied to different antenna element signals, this may be in the form of a code book that stores signals for generating beams in a certain direction and nulls in another direction. Where the signal is to be adapted an algorithm may be used to adapt it or in some embodiments a further code book may be used which sets different values to be applied in different circumstances.

Figure 1:
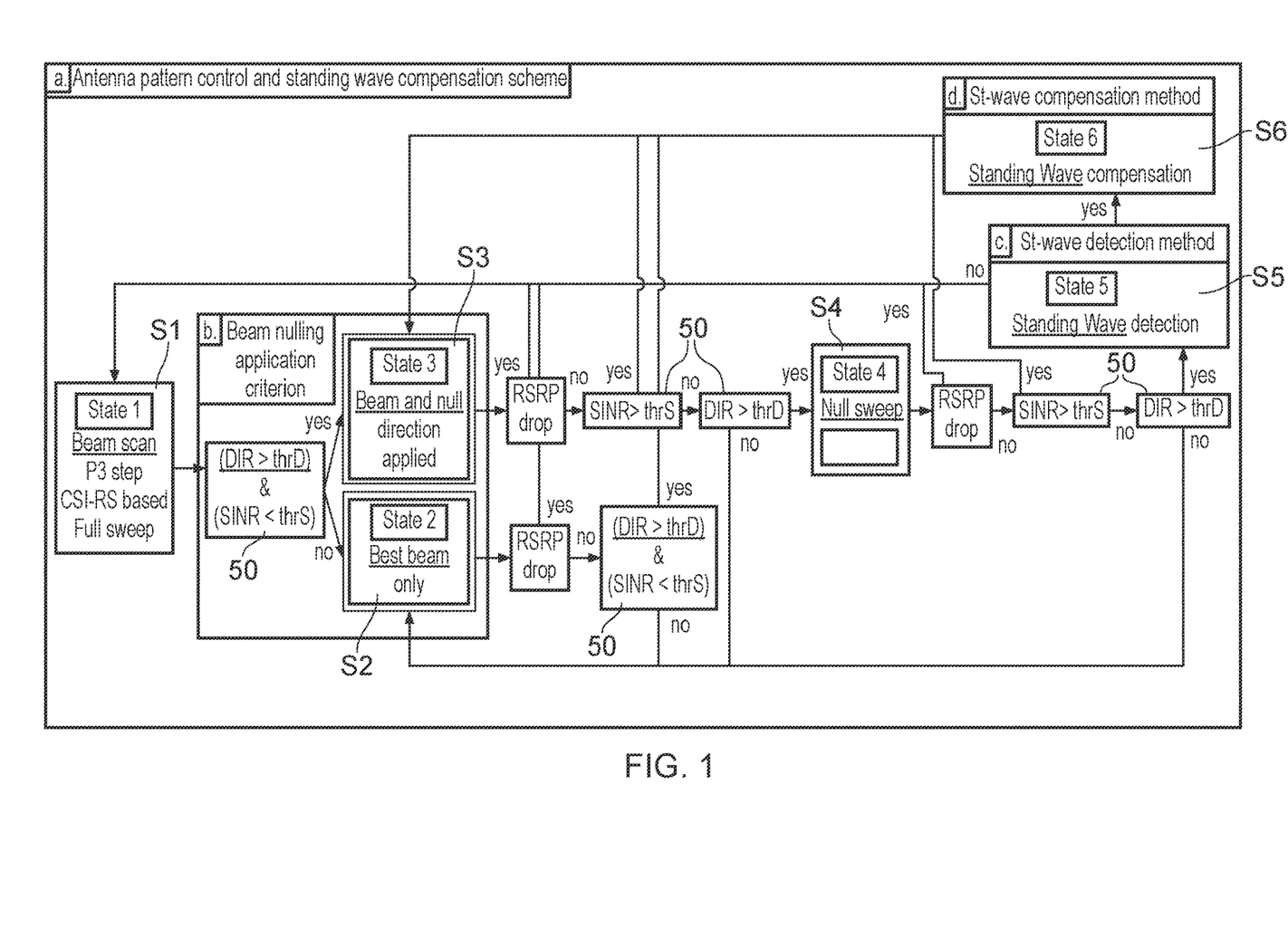
FIG. 1 shows a flow chart of the Dominant Interferer Ratio (DIR) based beam nulling and standing wave compensation scheme of an embodiment.

FIG. 1 schematically shows a flow chart illustrating a method according to an example embodiment. This scheme describes the UE beam phase shifter control states during CSI-RS (channel state information reference signal) UE beam tracking.

There are a total of 6 states:
1. Beam Scan
2. Best Beam only
3. Best Beam and Null direction applied
4. Null sweep
5. Standing Wave detection
6. Standing Wave compensation State 1: Beam Scan state S1 is commonly described as the P3 phase of beam alignment. The UE scans its set of possible beam directions to find the one giving the best downlink RSRP (reference signal power). During this state the UE can also determine the direction of the strongest interferer through SINR per beam evaluation.

Transition: At the end of the Beam Scan the UE will evaluate two conditions for the transition state:
        Condition: (DIR>thr) & (SINR<thr)
            If true→state 3
            else→state 2.

Having determined the best beam direction the UE will evaluate at comparator 50 two conditions to determine how to transition from this. These conditions are the DIR (dominant interferer ratio) and the SINR (signal to interference plus noise ratio). The comparator 50 determines if DIR is above a predetermined threshold and SINR below a certain threshold. If the DIR is above its threshold and the SINR is below its threshold then there is significant noise and a main interferer, so the method proceeds to S3 state 3 and a beam and steered null are formed, if not the method proceeds to S2, state 2. State 2 applies simply a best beam and is selected if the signal to interference plus noise ratio is such that the signal is received at an acceptable level and/or there is no dominant interferer so that the provision of one or more steered nulls may not improve the reception by any great amount and thus, the overheads associated with providing these steered nulls may not be merited.

State 2: "Best beam only" will direct the main beam of the UE towards the direction maximizing the RSRP without steering any null.
    Transition: Evaluate Drop of power then DIR and SINR.
        Condition: (RSRP<thrR),
            If true→state 1
            If false→continue to next expression
        Condition: (DIR>thrD) & (SINR<thrS)
            If true→state 3
            If false→keep state When operating with best beam only then a transition may occur if a drop in power is detected. This may be detected by the RSRP dropping below a particular threshold value and where this is the case the method may return from S2 to 1 i.e. state 1 and perform a beam scan whereas where the power is above the threshold level then DIR and SINR are evaluated again at a comparator 50, which may be an additional or the same comparator as that used when transitioning from state 1, and where DIR is above the threshold and SINR is below the threshold then the UE transitions to S3, state 3 where a beam and steered null are applied whereas if it is false it remains at S2 in state 2 with a best beam.

State 3: "Beast beam and null" will jointly direct the main beam of the UE toward the direction maximizing the RSRP while also directing the main null towards the direction of the strongest interferer.
    Transition: Evaluate Drop of power, then SINR, then DIR.
        Condition: (RSRP<thrR),
            If true→state 1
            If false→continue to next expression
        Condition: (SINR>thrS)
            If true→keep state (so stay in state 3)
            If false→continue to next expression
        Condition: (DIR>thrD)
            If true→state 4
            If false→state 2

If operating at S3 in state 3 there is a main beam directed towards a source and a main steered null directed towards the strongest interferer. This state is transitioned if there is a drop of power and the SINR and DIR pass certain thresholds. The condition of the power dropping below a particular threshold transitions the state back to S1, state 1 that is the beam scan. However if the power has not dropped below that but it is determined at a comparator 50 that the signal to noise ratio is above a threshold the UE stays at S3, in state 3 whereas if it is below a threshold and the DIR is above a certain threshold it proceeds to S4, state 4 where a null sweep is performed to detect an updated angular position for the steered null. As is described below.

State 4: "Null sweep", will perform a null scan while keeping the main beam fixed.
    Transition: Evaluate Drop of power, then SINR, then DIR.
        Condition: (RSRP<thrR),
            If true→state 1
            If false→continue to next expression
        Condition: (SINR>thrS)
            If true→keep state (so stay in state 3)
            If false→continue to next expression
        Condition: (DIR>thrD)
            If true→state 5
            If false→state 2

At the end of the null sweep S4 the received power is detected and if it is below a threshold the UE returns to the beam sweep state 1 to redirect the beam. If there is not a significant drop in received power the SINR is determined and if this is determined at comparator 50 to be above a threshold then the device returns to the beam and null direction of S3, state 3 while if it is below this threshold the DIR is evaluated at comparator 50 and if this is above the DIR threshold the device transitions to S5, state 5 where the standing waves associated with the UE are detected while if there is no dominant interferer we return to state 2 where we have the best beam only.

State 5: "Standing wave Detection", in this state the UE starts by triggering a status read of all standing wave determining units including external factors like user interaction and use of protective covers. Then it will compare the latest status read with the previous read on each unit. If there are no status changes it will transition to S3, state 3, else it will transition to S6 state 6.
    State 6: "Standing wave compensation", in this state the UE will apply the best front-end setting for the new standing wave status and then once applied it will change to S3 state 3.

In the FIG. thrR, thrS, thrD are the configurable thresholds, respectively associated to RSRP, SINR and DIR.

State 5 is associated with determining whether the current radiation pattern and in particular the null radiation pattern has been altered by changes in conditions which affect an internal standing wave. This change may be detected with an internal standing wave detector such as that shown in FIG. 2. The standing wave detector may be part of the beam management entity which includes the beam forming circuitry which determines and applies the phase shift and/or amplitude variations to the signals to and from the antenna elements of the antenna array. Standing wave detector 24 incudes a primary input parameter detection unit 26 and a secondary input parameter detection unit 28. The primary input detection unit 26 includes a proximity detector 27 for detecting the proximity of a user and in particular a user's hand to the antenna array and other detectors for detecting other factors that affect the radiation pattern such as whether or not there is a protective cover fitted on the user equipment. This may include a detector for detecting impedance changes of the sub six GHz antennas which may share the same volume or be adjacent to the antenna array which in this embodiment comprises a millimetre wave panel.

Figure 2:
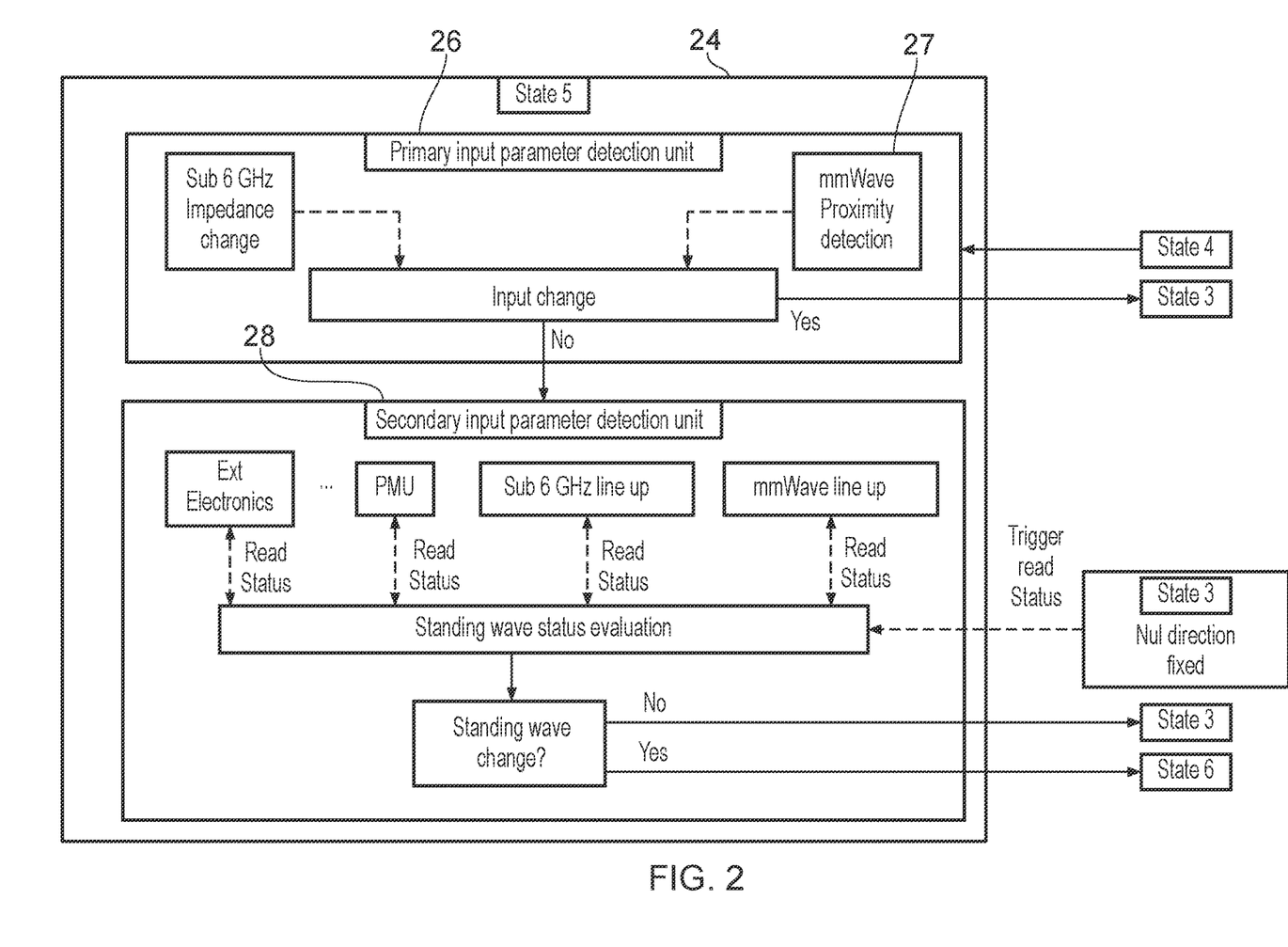
FIG. 2 schematically shows a standing wave detector unit.

There is also a secondary input parameter detection 28 which detects variations in components within the user equipment which may have an effect on the radiation pattern by creating their own standing waves. This may include detectors to detect activation or power supply level changes and may include the power management unit (PMU), digital to analogue converter (DAC), analogue to digital converter (ADC), a digital front end, self-interference cancellation, the transmitter driver/converter, a power amplifier for the uplink (transmit) and a low noise amplifier for the downlink (receive). Other electronic components which may affect standing waves include, and are not limited to, the camera, loud speaker, the USB charger and the screen. These different elements are considered as standing wave units and are configured to send a digital signal with information such as on/off or level indicators to the standing wave detector 24. Their current status is then compared to their former status and if a change is detected some compensation for the effect that this may have on the radiation pattern and in particular the radiation nulls may start. This evaluation may be done when necessary but proactively in order not to introduce undue delays in the state change between states 4 and 5 of FIG. 1. The trigger for this evaluation may vary, but in some embodiments may be when entering state 5 after the SINR is below the SINR threshold required to move to the DIR factor evaluation shown in FIG. 1.

The background behind standing wave compensation relates to the electrical ground plane associated with the antenna array which will generate standing waves that may not significantly affect the main beam shape but do affect the side lobe shape and nulling properties of the array radiation patterns significantly. In this regard, the currents generated by the antenna elements of the antenna array are needed for the radiation but should ideally be limited to the vicinity near the antenna array for known and pre-characterizable behaviour. An electrically large ground plane (relative to operational frequencies, and therefore wavelengths, of the antenna array) will generate standing waves and though they don't affect significantly the main beam shape of the considered array, they do affect the sidelobe shape and nulling properties of the array radiation pattern significantly.

For each received CSI-RS sample in the PDSCH (Physical Downlink Shared Channel) for a UE implementing embodiments, an RSRP and an SINR value are estimated.

The factors or standing waves which affect the radiation pattern may be compensated for in different ways and these are disclosed later with respect to FIGS. 5 and 6.

Figure 3:
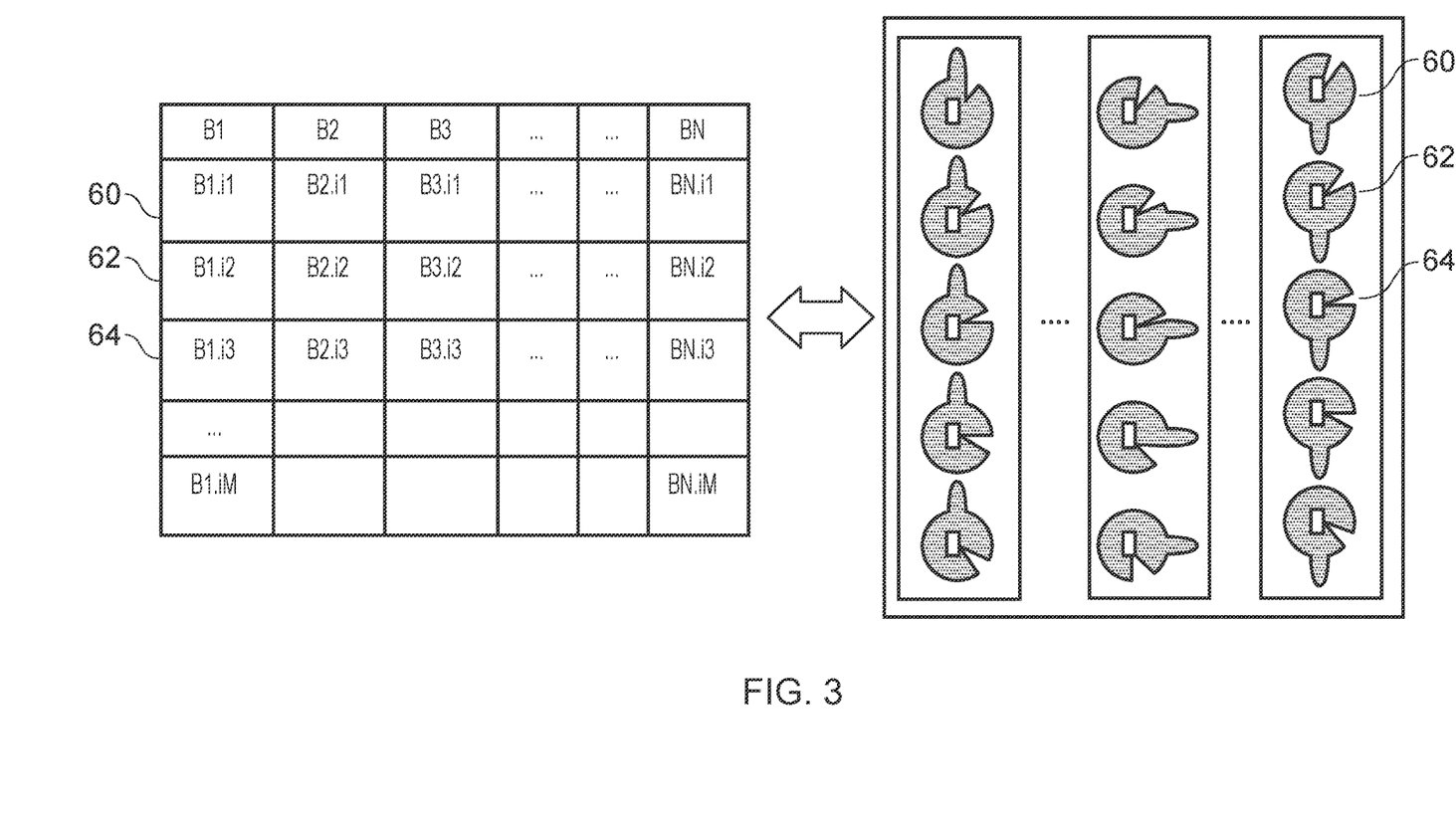
FIG. 3 schematically shows a database of code book entries and associated radiation patterns.

Generating the beam and steered nulls of a desired radiation pattern is done by applying a beam forming vector to amplitude and/or phase shift circuitry associated with the different antenna elements of the antenna array. This vector may be generated in a number of ways but in some embodiments is selected from a data base or code book storing such vectors. FIG. 3 schematically shows such a data base or code book that stores vectors to be applied to the amplitude and/or phase shift circuitry along with the associated beam and steered null direction. As can be seen the top row 60, 62 relates to a null at about 30° with the main beam radiating in different directions. The next row 64 has the null shifted clockwise to about 60° and again has different directions for the main beam. Thus, following beam sweeps performed by the UE to discover the direction that the signal is coming from and the direction of the main interferer where a main interferer has been identified, one of these patterns may be selected as being preferred. The code book entry corresponding to the identified beam and null directions is then selected and applied to the circuitry transmitting or receiving signals from the antenna elements of the antenna array.

Figure 4:
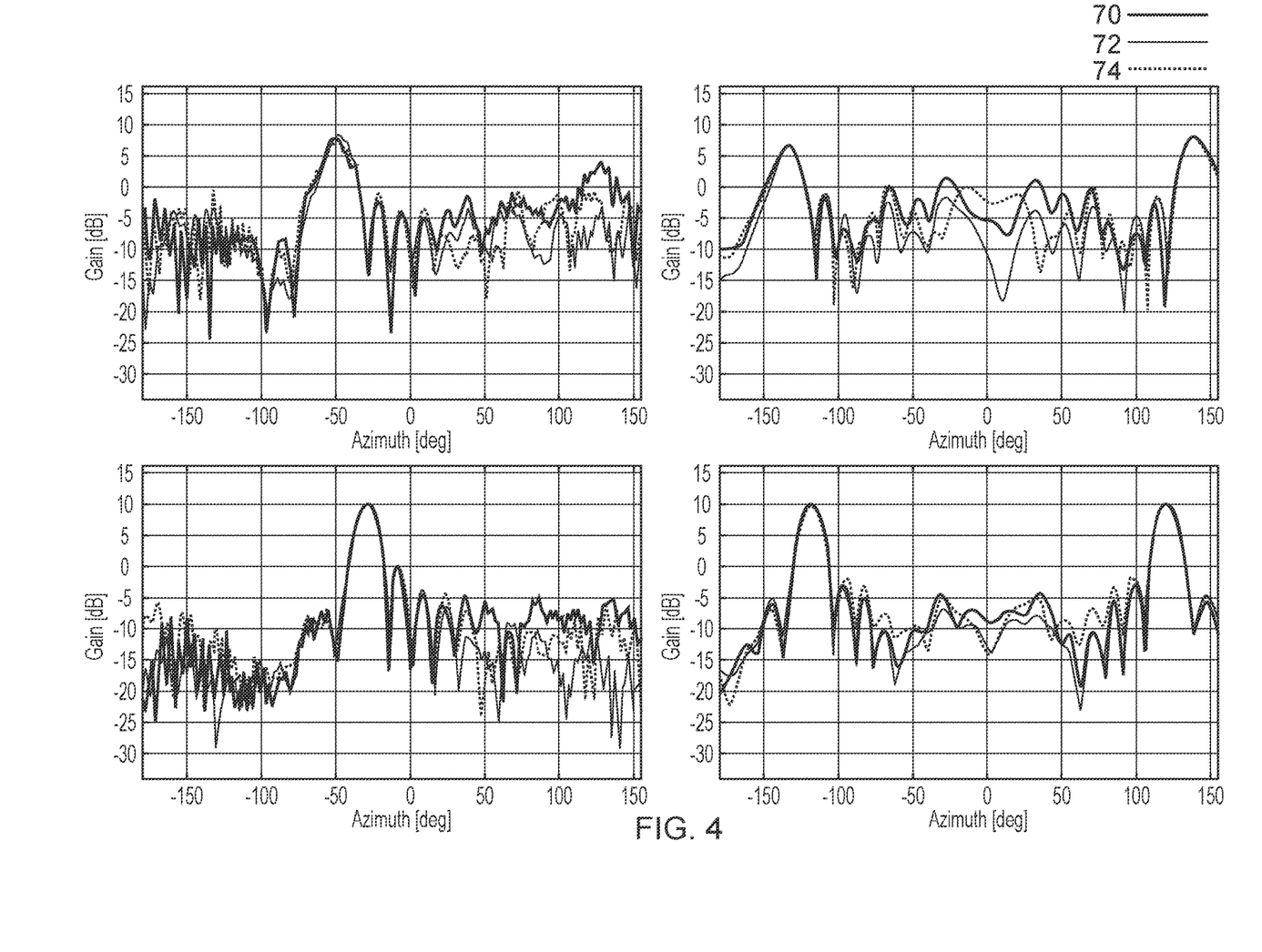
FIG. 4 shows examples of the impact of a standing wave on nulls in a radiation pattern around a user equipment.

FIG. 4 schematically shows how different conditions provide different standing waves and affect the radiation pattern and particularly the nulls. In these embodiments, line 70 corresponds to a UE in free space, while line 74 indicates a protective cover being present while 72 indicates the situation where the user is touching the corner of the UE. The upper left hand figure is for an antenna array which is centred along the top edge (shorter edge or side of the UE) of the UE and configured to generate an angular beam steering direction of −45° when viewed looking towards the top of the UE. The upper right-hand figure is a 2D cut, as seen from the front of the device. The lower figures are an example of the impact of standing waves for an antenna array which is designed with a 10 mm offset (from the centre of the shorter side of the UE) and configured to generate an angular beam steering direction of −30°, with the left hand figure being a 2D cut, as seen from the top of the device and the right hand figure being a 2D cut, as seen from the front of the device. As can be seen in both examples the main beam is preserved but the variations of the null can in some directions be as high as 15 to 20 dB and in many directions 5 to 10 dB. In summary the beam nulls are sensitive to standing waves and mitigation of this effect will help maintain an effective SINR in a dynamic UE environment.

In some example embodiments, the UE may alternatively have equal length sides (or edges) and thus the antenna array may be designed to be located at the centre of such a side of the UE, at an offset from the centre of such a side of the UE, or close to an end of such a side of the UE. It should be appreciated that the location of an array of antenna elements may include wrapping around the corner(s) and/or side(s) of the UE so that the antenna array may have one or more antenna element on one side of the UE and one or more antenna element on another side of the UE to form one of the antenna arrays. A side or edge of a UE is described as being any of four sides, where each side forms a minor surface of the UE and where two further faces also exist to form major surfaces of the UE such that the four sides and two faces together form a closed box or housing of the UE. A UE may in some example embodiments comprise a single housing for all of its electronic components and antennas, and in some embodiments the UE may comprise two or more housings which are connected together using mechanical means and where some or all of the electronic components and/or antennas may be distributed across the two or more housings, and/or some or all of the electronic components and/or antennas may be located only in one of the two or more housings.

Figure 5:
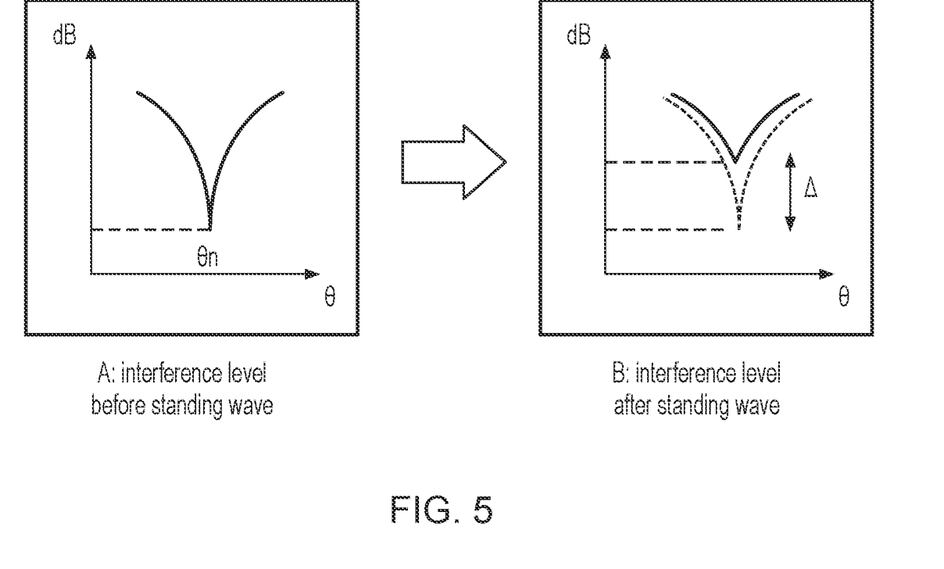
FIG. 5 shows a null position and the impact of the loss of nulling due to standing waves.

FIG. 5 shows how the interference level at a UE may be impacted by the presence of a standing wave affecting the steered null. The left-hand figures show the low signal at the direction of the main interferer prior to the standing wave, while the right-hand figures shows how the interfering signal has increased as the null is affected.

Figure 6:
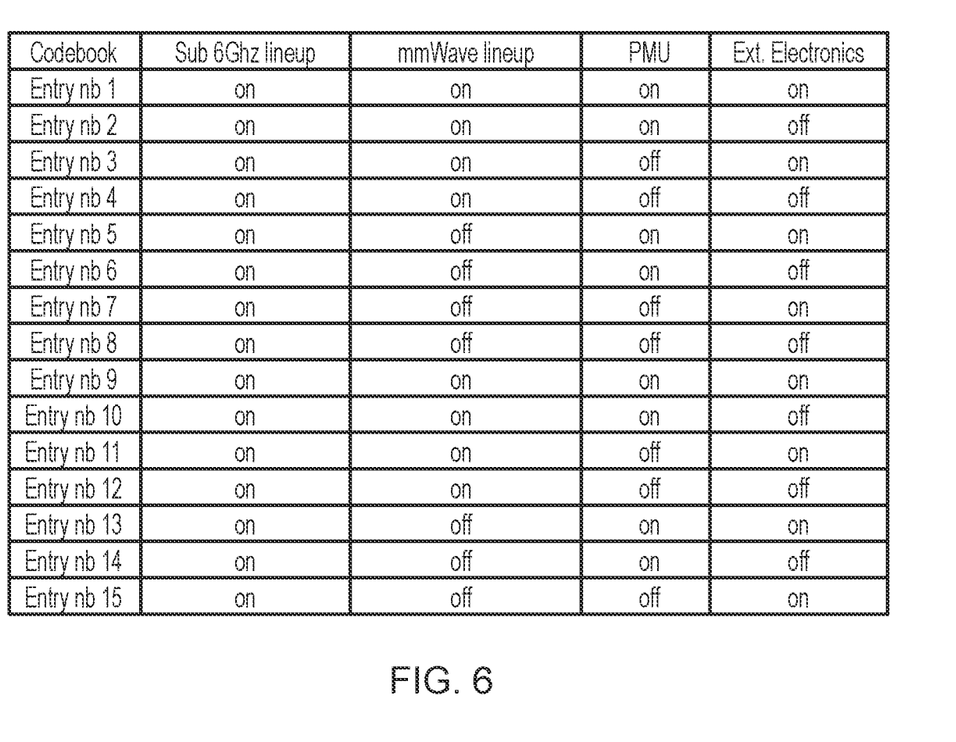
FIG. 6 shows a database of pre-calculated relationships between standing wave sources and associated code book entries.

FIG. 6 shows a dedicated lookup table that matches codebook entries for a given interference angle with the electronic components it is determined have triggered the standing wave and provides an adjustment to that codebook entry. These adjustments compensate for the change in radiation pattern caused by the detected standing wave. Changes in radiation pattern caused by the standing waves may be determined in a number of ways and in the example of FIG. 6 the components within the UE which are known to affect the standing waves are related to different adjustment entries such that when one component switches between an on and an off state a corresponding compensation to the beam forming signal vector can be selected from the lookup table.

An advantage of this method is that it is quick and does not need training. By pre-calculating/estimating the relationship the UE nulling mechanism can compensate for the predicted standing wave that is triggered by the change in this component to improve the code book selection to compensate for the standing wave. Different granularities can be considered, however generally only a few elements within the standing wave units would have a significant impact and this allows the number of entries to be reduced and to be tailored to these particular elements.

An alternative method to compensate for changes in the radiation pattern due to standing waves is a systematic round robin search of all codebook entries corresponding to the detected signal and interfering direction. Once the codebook entry triggers the SINR to be increased above a threshold that entry is selected. This method may not be particularly rapid.

Figure 7:
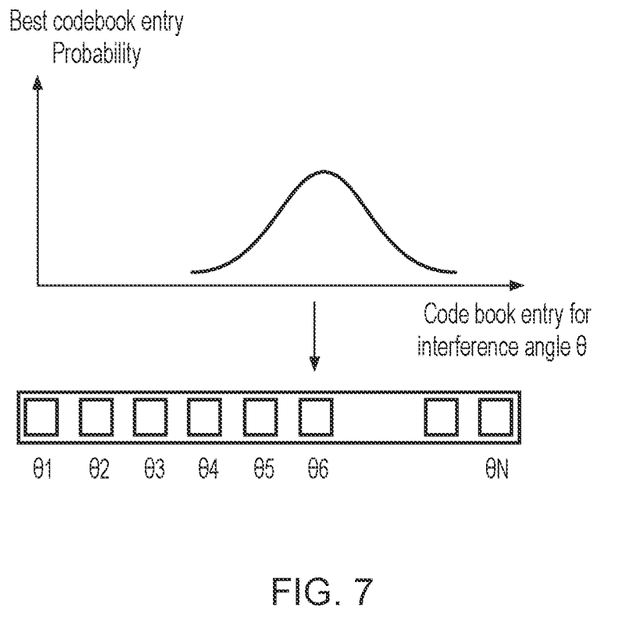
FIG. 7 shows selection of code book entries for each null and the offset probability of the best code book entry.

An alternative is the closest codebook entry search where nearby codebook entries are searched first and this is schematically illustrated in FIG. 7 which shows how the best codebook entry is likely to be one close to the current code book entry. The likelihood of a nearby codebook entry increasing the performance is therefore higher than the probability of a distant one. Thus, preferentially using a nearby codebook entry improves the probability of finding an improved codebook entry to improve the signal after interference by a standing wave and thus, the system will probably find an improved radiation pattern more quickly.

Figure 8:
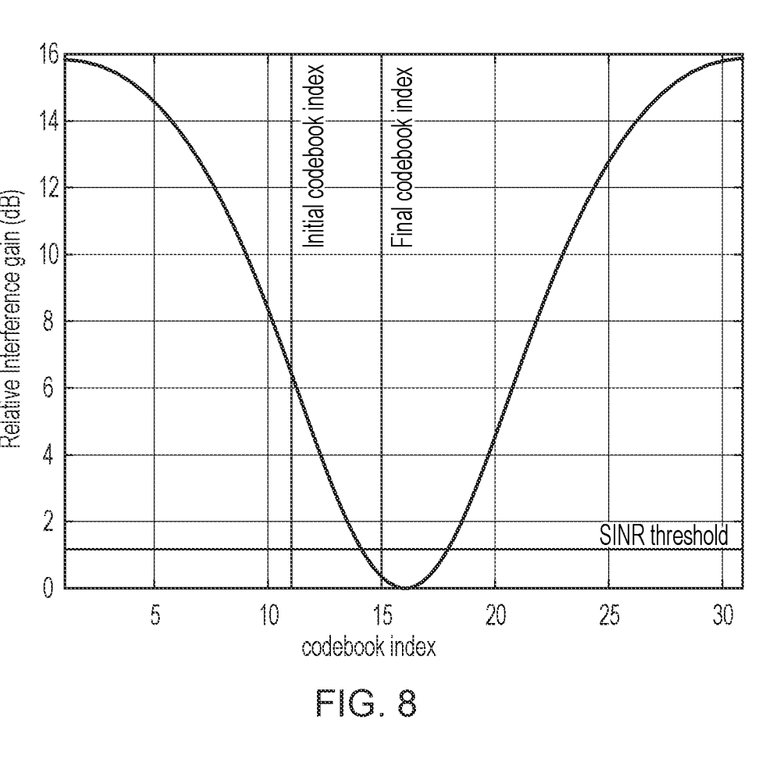
FIG. 8 shows an example of the outcome of the closest code book search.

The closest codebook entry search will increment its search starting from the codebook entry that was used before entering into "state 5" in FIG. 2. This starting point is called "initial codebook index" in FIG. 8. The search will then start estimating the Relative Interference gain at the closest codebook entries by alternating: first an increment and then a decrement of codebook indexing. For each alternation the step size is increased by 1 sample. The search is stopped as soon as the desired performance is achieved. This is parametrized through a manufacturer configurable SINR threshold. This closest codebook entry search would still not be as fast as the "pre-characterized link" method.

Figure 9:
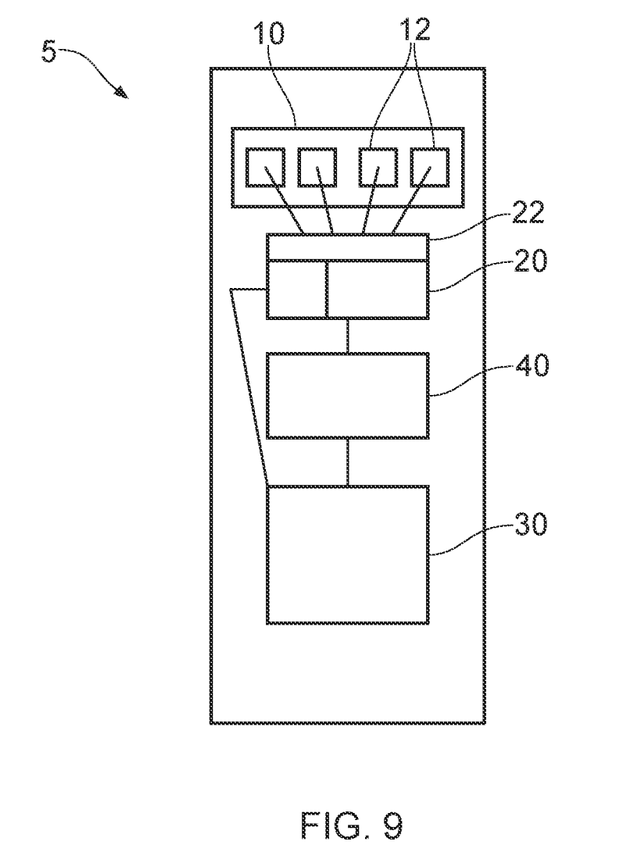
FIG. 9 shows a user equipment according to an embodiment.

FIG. 9 shows a UE 5 according to an embodiment. UE 5 comprises a millimetre antenna array 10 comprising a plurality of antenna elements 12. The antenna array 10 is connected to beam management entity 20 which comprises amplitude and phase shift circuitry 22 which circuitry controls the phase and amplitude of the RF signals applied to or received from the antenna elements, which in turn sets the direction and magnitude of the radiated beam(s) from the array such that signals to or from a source are amplified and signals to and from an interferer are reduced. In effect a beam direction and at least one steered null direction is provided. Once a main beam is selected and directed to a base station (network node) the UE is then in communication with the BS, i.e. the UE is receiving and transmitting RF signals from/to the BS.

The UE 5 also comprises control circuitry 40 configured to determine the signal strength of interfering signals received at the antenna array and to determine from this the DIR. There is also a comparator within circuitry 40 for comparing the DIR to a predetermined threshold value. Circuitry 40 is also configured to determine the SINR and to compare this to a threshold value and to determine the RSRP. In this way control circuitry 40 is able to determine when the DIR is above a threshold value and the SINR is below a threshold value and at this point to send a control signal to the beam management entity 20 indicating that a steered beam with at least one steered null is required. The direction of these may be determined by conventional beam sweeping procedures and then the required beam forming signal vector selected from database 30. These are then applied to the amplitude and/or phase shift circuitry 22.

Beam management entity 20 also comprises a standing wave detector unit similar to that shown in FIG. 2 which can detect standing waves that trigger changes in the radiation pattern. Where changes in the radiation pattern are detected either by detecting the standing waves from the standing wave detector or by detecting changes in the power received, changes in the SINR and/or the DIR then circuitry 40 will seek to compensate for changes in the steered null(s) by varying the beam forming signal applied to the amplitude and/or phase circuitry 22. This may be done by selecting an updated entry from the database 30 or by selecting an adjustment value from a lookup table such as is shown in FIG. 5.

In summary, embodiments provide a unique UE receiver and method enabling high performance SINR increase via beam nulling, and in some embodiments standing wave compensation.

A desired and undesired signal may be tracked at the same time, while applying a UE antenna radiation pattern that improves the signal to interference and noise ratio. The activated and pattern optimised UE antenna array will experience standing waves due to the large electrical size of the UE chassis, legacy antennas (for example cellular and non-cellular antenna elements for any radio system other than 5G) and electrically active components such as RF elements, camera, loudspeaker and sensors within the vicinity of the antenna array on the handset. The standing waves affect the depth and/or direction of the nulls, since they are affected by small changes in the near field signal. These standing waves may be detected and compensated for by adjusting the steered nulls to retain a good signal to interference and noise ratio.

Under interference conditions the throughput and data decoding performance of a UE such as a 5G NR mmWave terminal utilizing the proposed procedure will be improved compared to handsets that do not use this technique. Although embodiments are particularly effective when applied to a 5G NR mmWave terminal, embodiments are not limited thereto but may be applied to other user equipment using any radio protocol which requires the use of antenna arrays.

The steps of this procedure may include:
a. Novel antenna pattern control and standing wave compensation scheme including user and protective cover detection
b. Novel beam nulling application criterion
c. Novel standing wave change detection
d. Novel standing wave compensation method for beam nulling In effect the problem of how to track the desired signal and undesired signal(s) simultaneously, while applying a UE antenna array radiation pattern that increases the Signal to Interference and noise ratio is addressed, along with enabling the UE to compensate for the dynamic effects of the standing waves in order to keep the null steering effective.

Performing beam nulling without these elements will lead to poor performance.

Embodiments seek to establish whether there are valid conditions for apply nulling techniques through evaluation of the Dominant Interferer Ratio (DIR) factor and SINR level. IF the DIR factor is above a threshold and the SINR is below a threshold, beam nulling has good performance enhancement conditions. If the DIR factor is below a certain threshold then it will not make sense to perform beam nulling. If the SINR is very good there is no interference to cancel further.

Detect Standing Wave Change

The UE will monitor key electrically fed components that may be the standing wave change contributors. When these electrical components change state (for example from on to off or vice versa) the UE will use them as a gate for starting the compensation and adjust its nulling for new standing wave conditions and keep a high-performance interference nulling.

Novel standing wave compensation method for beam nulling is provided where a pre-characterized table of relationships between the best codebook and the active elements affecting the standing waves is proposed.

A UE may be any portable electronic device having wireless communication capabilities, such as and not limited to: a portable electronic device, a smartphone, a mobile phone, a robot, an IoT device, a transportable electronic device (radio device in an automobile, an aircraft, a vessel, a vehicle, etc), a smartwatch, a portable computer, a laptop, a tablet, a portable music player, a portable video device, a portable navigation aid, a wearable electronic device having wireless communication capability.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
at least one processor; and
at least one memory including computer program code, said at least one memory and computer program code being configured to, with said at least one processor, cause the apparatus to perform at least the following:
determine a signal strength of interfering signals received at an antenna array within a user equipment;
determine a dominant interfering ratio indicative of a strength of a strongest interfering signal relative to a strength of at least one other interfering signal;
compare said dominant interfering ratio to a predetermined ratio value; and
where said dominant interfering ratio exceeds said predetermined ratio value, generate a beam forming signal for applying to at least one of amplitude and phase shift circuitry associated with the antenna array to generate a radiation pattern comprising a beam and at least one steered null.

2. The apparatus according to claim 1, wherein:
said at least one memory and computer program code are further configured to, with said at least one processor, cause the apparatus, in response to said dominant interfering ratio being less than said predetermined ratio value to generate a control signal, to apply said beam forming signal to at least one of the amplitude and phase shift circuitry to generate a radiation pattern comprising a beam and no steered nulls.

3. The apparatus according to claim 1, said at least one memory and computer program code are further configured to, with said at least one processor, cause the apparatus to determine a signal to interference plus noise ratio and in response to said signal to interference plus noise ratio being greater than a predetermined value to generate a control signal to apply the beam forming signal to at least one of the amplitude and phase shift circuitry to generate a radiation pattern comprising a beam and no steered nulls.

4. The apparatus according to claim 1, wherein said at least one memory and computer program code are further configured to, with said at least one processor, cause the apparatus to monitor for at least one condition change at said user equipment that affects nulls in a radiation pattern at said user equipment when said beam forming signal applied to said at least one of the amplitude and phase shift circuitry comprises the beam forming signal generating the radiation pattern comprising the beam and the at least one steered null, said at least one memory and computer program code being further configured to, with said at least one processor, cause the apparatus, in response to detecting said at least one condition change, to generate a control signal to apply to said at least one of the amplitude and phase shift circuitry to amend said beam forming signal to at least partially compensate for changes in said at least one steered null in said radiation pattern.

5. The apparatus according to claim 4, said at least one memory and computer program code are further configured to, with said at least one processor, cause the apparatus to amend said beam forming signal to generate a plurality of updated radiation patterns by changing an angular position of said at least one steered null a plurality of times; and
wherein said at least one memory and computer program code are further configured to, with said at least one processor, cause the apparatus to determine a preferred angular position of said at least one steered null, by determining received power, signal to interference plus noise ratio and said dominant interfering ratio for said plurality of updated radiation patterns.

6. The apparatus according to claim 4, wherein said at least one memory and computer program code are configured to, with said at least one processor, cause the apparatus to detect said at least one condition change from at least one of a detected reduction in received power at said antenna array; a reduction in a signal to interference plus noise ratio; and an increase in said dominant interfering ratio.

7. The apparatus according to claim 4, wherein said at least one memory and computer program code are configured to, with said at least one processor, cause the apparatus to detect said at least one condition change, by detecting at least one of: changes in a user's proximity from a proximity sensor, and changes in operational conditions of at least one of a plurality of predetermined components within said user equipment.

8. The apparatus according to claim 4, further comprising a data base for storing a plurality of signal vectors for applying to said at least one of amplitude and phase shift circuitry to generate different radiation patterns;
said at least one memory and computer program code being configured to, with said at least one processor, cause the apparatus to generate said beam forming signal by selecting one of said plurality of signal vectors.

9. The apparatus according to claim 8, wherein said at least one memory and computer program code are configured to, with said at least one processor, cause the apparatus to amend said beam forming signal to at least partially compensate for changes in said at least one steered null in said radiation pattern by selecting an updated value from said data base and determining from a determining means whether a signal to interference plus noise ratio increases and if not discarding said selected updated value and selecting a further value.

10. The apparatus according to claim 8, wherein said at least one memory and computer program code are configured to, with said at least one processor, cause the apparatus to detect said at least one condition change, by detecting at least one of: changes in a user's proximity from a proximity sensor, and changes in operational conditions of at least one of a plurality of predetermined components within said user equipment, and wherein said at least one memory and computer program code is configured to, with said at least one processor, cause the apparatus to amend said beam forming signal by selecting an amended data base entry related to said detected predetermined operational change.

11. The apparatus according to claim 6, wherein said at least one memory and computer program code are configured to, with said at least one processor, cause the apparatus to amend said beam forming signal to at least partially compensate for changes in said at least one steered null in said radiation pattern by applying an algorithm related to said detected change in operational conditions to said beam forming signal and determining from a determining means whether said signal to interference plus noise ratio increases.

12. A user equipment comprising:
an antenna array comprising a plurality of antenna elements;
at least one of amplitude and phase shift circuitry associated with said antenna elements of said antennal array; and
the apparatus according to claim 1.

13. A method comprising:
determining a signal strength of interfering signals received at an antenna system within a user equipment;
determining a dominant interfering ratio indicative of a strength of a strongest interfering signal relative to a strength of at least one other interfering signal;
comparing said dominant interfering ratio to a predetermined ratio value; and
where said dominant interfering ratio exceeds said predetermined ratio value, generating a beam forming signal for applying to at least one of amplitude and phase shift circuitry associated with said antenna array to generate a radiation pattern comprising a beam and at least one steered null.

14. A program storage device comprising a digital memory, a magnetic storage media, a hard drive, or an optically readable digital data storage media, the program storage device storing computer program comprising instructions for causing an apparatus to perform at least the following:
determine a signal strength of interfering signals received at an antenna array within a user equipment;
determine a dominant interfering ratio indicative of a strength of a strongest interfering signal relative to a strength of at least one other interfering signal; and
compare said dominant interfering ratio to a predetermined ratio value; and
where said dominant interfering ratio exceeds said predetermined ratio value, generate a beam forming signal for applying to at least one of amplitude and phase shift circuitry associated with said antenna array to generate a radiation pattern comprising a beam and at least one steered null.

15. The method according to claim 13, further comprising:
in response to said dominant interfering ratio being less than said predetermined ratio value to generate a control signal, applying said beam forming signal to at least one of the amplitude and phase shift circuitry to generate a radiation pattern comprising a beam and no steered nulls.

16. The method according to claim 13, further comprising:
determining a signal to interference plus noise ratio; and
in response to said signal to interference plus noise ratio being greater than a predetermined value, generating a control signal to apply the beam forming signal to at least one of the amplitude and phase shift circuitry to generate a radiation pattern comprising a beam and no steered nulls.

17. The method according to claim 13, further comprising:
monitoring for at least one condition change at said user equipment that affects nulls in a radiation pattern at said user equipment when said beam forming signal applied to said at least one of the amplitude and phase shift circuitry comprises the beam forming signal generating the radiation pattern comprising the beam and the at least one steered null; and
in response to detecting said at least one condition change, generating a control signal to apply to said at least one of the amplitude and phase shift circuitry to amend said beam forming signal to at least partially compensate for changes in said at least one steered null in said radiation pattern.

18. The method according to claim 17, further comprising:
- amending said beam forming signal to generate a plurality of updated radiation patterns by changing an angular position of said at least one steered null a plurality of times; and
- determining a preferred angular position of said at least one steered null, by determining received power, signal to interference plus noise ratio and said dominant interfering ratio for said plurality of updated radiation patterns.

19. The method according to claim 17, wherein detecting said at least one condition change comprises detecting at least one of a detected reduction in received power at said antenna array; a reduction in signal to interference plus noise ratio; and an increase in said dominant interfering ratio.

20. The method according to claim 17, wherein detecting said at least one condition change comprises detecting at least one of: changes in a user's proximity from a proximity sensor, and changes in operational conditions of at least one of a plurality of predetermined components within said user equipment.

* * * * *

UNITED STATES PATENT AND TRADEMARK OFFICE
CERTIFICATE OF CORRECTION

PATENT NO. : 11,817,919 B2
APPLICATION NO. : 17/555078
DATED : November 14, 2023
INVENTOR(S) : Christian Rom et al.

Page 1 of 1

It is certified that error appears in the above-identified patent and that said Letters Patent is hereby corrected as shown below:

In the Claims

In Column 20, Lines 16-17, Claim 14, delete "magnetic storage media, a hard drive, or an optically readable digital data storage media, the" and insert -- magnetic storage media, or a hard drive, the --, therefor.

Signed and Sealed this
Fourth Day of June, 2024

Katherine Kelly Vidal
*Director of the United States Patent and Trademark Office*